(12) United States Patent
Tsuchinaga et al.

(10) Patent No.: US 7,440,221 B2
(45) Date of Patent: Oct. 21, 2008

(54) CALIBRATION OF READER/WRITER OFFSET IN HARD DISK DRIVE USING SHINGLED RECORDING

(75) Inventors: Hiroyuki Tsuchinaga, Tokyo (JP); Terumi Takashi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 41 days.

(21) Appl. No.: 11/497,975

(22) Filed: Aug. 1, 2006

(65) Prior Publication Data

US 2007/0030588 A1 Feb. 8, 2007

(30) Foreign Application Priority Data

Aug. 5, 2005 (JP) ............................. 2005-228634

(51) Int. Cl.
*G11B 5/58* (2006.01)
(52) U.S. Cl. ................................... 360/77.01
(58) Field of Classification Search ........................ None
See application file for complete search history.

(56) References Cited

U.S. PATENT DOCUMENTS

| | | | | |
|---|---|---|---|---|
| 5,233,487 A | * | 8/1993 | Christensen et al. | 360/77.04 |
| 5,796,543 A | * | 8/1998 | Ton-That | 360/77.08 |
| 6,014,283 A | * | 1/2000 | Codilian et al. | 360/77.08 |
| 6,078,460 A | * | 6/2000 | Moriya | 360/77.04 |
| 6,185,063 B1 | | 2/2001 | Cameron | |
| 6,437,947 B1 | * | 8/2002 | Uno | 360/78.04 |
| 6,967,810 B2 | * | 11/2005 | Kasiraj et al. | 360/78.04 |
| 7,019,939 B2 | * | 3/2006 | Kusumoto et al. | 360/78.14 |
| 7,133,241 B2 | * | 11/2006 | Che et al. | 360/75 |

* cited by examiner

*Primary Examiner*—K. Wong
(74) *Attorney, Agent, or Firm*—Townsend and Townsend and Crew LLP; Rambod Nader (57) ABSTRACT

Embodiments of the invention provide a disk drive that is capable of determining the offset of a magnetic head position through simple and easy processing in a case where the shingle write method is adopted, and that is capable of increasing the accuracy. In one embodiment, a disk drive comprises: a recording medium including data tracks, each of which is formed with part of the data track being overwritten by an adjacent data track on the inner circumferential side or by an adjacent data track on the outer circumferential side; a head assembly including a write head for writing information to the recording medium, and a read head for reading out information from the recording medium; and a control device for controlling a position of the head assembly relative to the recording medium. Position-error detection signals whose phases differ from each other are repeatedly written to the recording medium in the track direction with written positions of the position-error detection signals being deviated from each other by a track pitch in the track width direction; and the control device controls a position of the head assembly on the basis of a burst signal read by the read head.

13 Claims, 6 Drawing Sheets

CALIBRATION OF READER/WRITER OFFSET IN HARD DISK DRIVE USING SHINGLED RECORDING

CROSS-REFERENCES TO RELATED APPLICATIONS

This application claims priority from Japanese Patent Application No. JP2005-228634, filed Aug. 5, 2005, the entire disclosure of which is incorporated herein by reference.

BACKGROUND OF THE INVENTION

The present invention relates to disk drives such as a hard disk.

In recent years, various kinds of devices are equipped with hard disks. For example, portable music players and car navigation systems are each equipped with a hard disk. Under the circumstances, a shingle write method is known as one of the techniques for increasing the storage capacity for information with the size of a hard disk itself being miniaturized. In this method, data is successively written to a data track with part of the data track being overwritten by an adjacent data track from the inner circumferential side to the outer circumferential side on a recording medium so that the data tracks form a pattern like shingles. As a result, it is possible to realize a data track narrower than the actual write width of a magnetic head.

However, if this method is adopted, for example, when data is written to a k-th data track (k is counted from the inner circumferential side), all data tracks from the k-th track to the outermost circumferential track must be rewritten. For this reason, in order to reduce the overhead of the rewriting, patent document 1 (U.S. Pat. No. 6,185,063) discloses the technique as described below.

To be more specific, according to the technique disclosed in patent document 1, two data tracks are treated as a group, and writing is performed for this group by the shingle write method. In other words, between the two data tracks constituting the group, writing is first performed for the data track on the inner circumferential side, and then writing is performed for the data track on the outer circumferential side. Here, part of the data track on the outer circumferential side is not overwritten. Accordingly, this data track on the outer circumferential side becomes a data track having the same width as the write width of the magnetic head.

According to this method, because a read position of an odd number data track is allowed to differ from that of an even number data track, it is possible to set a read position with overwritten part (overlapped part) of the data tracks which constitute the group being excluded (refer to FIG. 10 of patent document 1). Therefore, it is possible to rewrite data relatively flexibly.

BRIEF SUMMARY OF THE INVENTION

In this shingle write method, because the write width of data differs from the width of a data track after the completion of writing the data, it is insufficient to perform only adjustment of a center position of the magnetic head at the time of writing the data to a center position of the magnetic head at the time of reading out the data. More specifically, it is necessary to determine a difference (offset) between a position of the magnetic head at the time of writing and a position of the magnetic head at the time of reading. Even in the case of the conventional hard disk drives, an offset caused by a skew angle between the write head and the read head is measured and determined by use of a condition under which the amplitude of a read signal reaches the maximum, and a condition under which an error rate of the written data reaches the minimum.

However, if the method using the condition under which the amplitude of a read signal reaches the maximum is adopted, the sensitivity to a change in amplitude of the read signal with respect to a deviation in offset is low. Accordingly, it is difficult to improve the accuracy in the determination of the offset. Additionally, a method for measuring an error rate is complex to perform error-rate measurement processing, and accordingly a processing load becomes greater.

Moreover, the shingle write method has the problem that a data read position shifts due to fluctuations in the write track width. To be more specific, when a write current fluctuates as a result of the change in environmental temperature, even if the read head is positioned using the offset that has been adjusted before shipment, the read head deviates from an optimum position.

The present invention has been devised in view of the above situations. One feature of the present invention is to provide a disk drive that is capable of, in a case where the shingle write method is adopted, determining the above offset of a magnetic head position through simple and easy processing which can cope with readjustment after shipment, and that is capable of keeping the accuracy of settings unchanged even if fluctuations in the write track width occur.

According to one aspect of the present invention, a disk drive comprises a recording medium including data tracks that are concentrically or spirally formed, each of the data tracks being formed with part of each data track being overwritten by an adjacent data track on the inner circumferential side or by an adjacent data track on the outer circumferential side; a head assembly including a write head for writing information to the recording medium, and a read head for reading out information from the recording medium; and a control device for controlling a position of the head assembly relative to the recording medium. Position-error detection signals whose phases differ from each other are repeatedly written to a data track area in the track direction with written positions of the position-error detection signals being deviated from each other by a track pitch in the track width direction. The control device controls a position of the head assembly on the basis of the position-error detection signals read out by the read head.

DETAILED DESCRIPTION OF THE INVENTION

Figure 1:
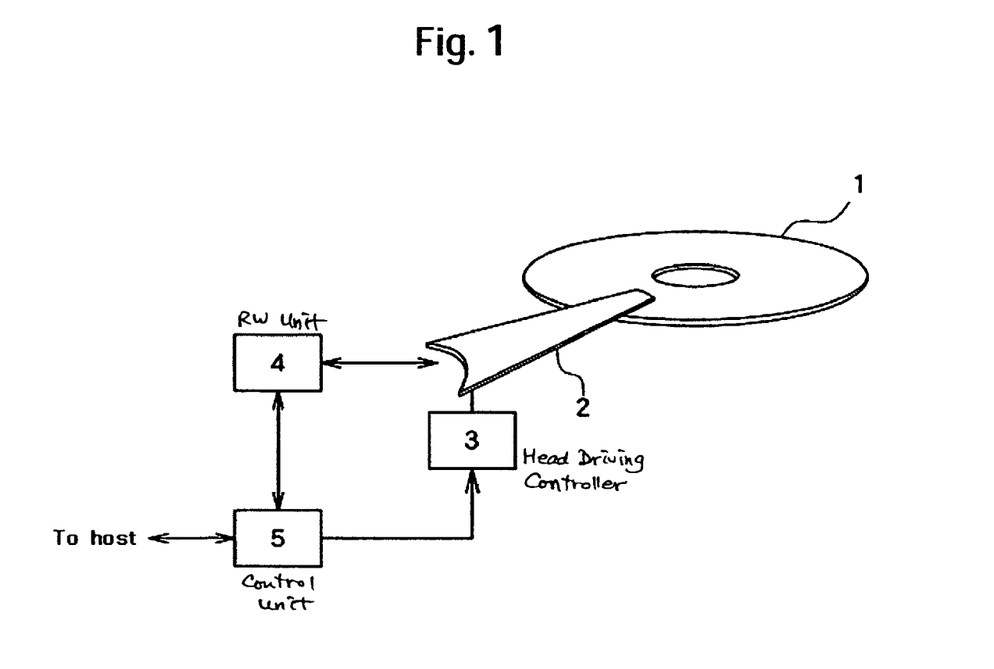
FIG. 1 is a block diagram schematically illustrating a disk drive according to an embodiment of the present invention.

An embodiment of the present invention will be described with reference to the drawings as below. A disk drive according to the embodiment of the present invention is, for example, a hard disk. As shown in FIG. 1, the disk drive comprises a recording medium 1, a head unit 2, a head driving controller 3, a read/write (RW) unit 4, and a control unit 5.

The recording medium 1 is a disc-like magnetic recording medium. This recording medium 1 is secured to a base of a case, and is supported so that the recording medium 1 can rotate. Data tracks are concentrically or spirally formed on the recording medium 1. The data tracks include a data track, part of which is overwritten by an adjacent data track on the inner circumferential side or by an adjacent data track on the outer circumferential side. In other words, the shingle write method is applied to at least some data tracks.

Figure 2:
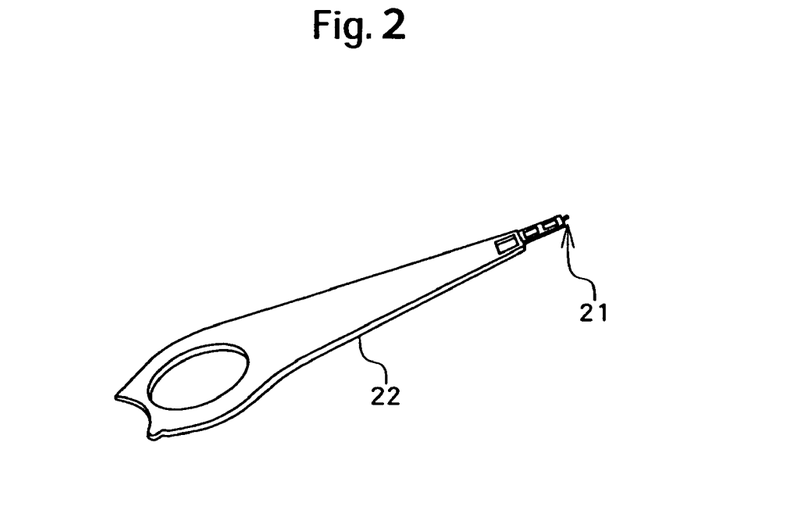
FIG. 2 is a schematic diagram illustrating a head unit according to an embodiment of the present invention.

The head unit 2 includes at least one head assembly. As roughly shown in FIG. 2, this head assembly comprises: heads 21, each of which is associated with each recording surface of the recording medium 1; and arms 22, each of which supports each of the heads 21. The head unit 2 is supported so that the head unit 2 can pivotally move about the center of rotation of a voice coil motor.

According to an instruction inputted from the control unit 5, the head driving controller 3 drives the voice coil motor to control a position of the head 21 included in the head unit 2. The RW unit 4 performs specified processing, such as decoding, for information read out from the recording medium 1 by a read head included in the head 21, and then outputs the information to the control unit 5. In addition, the RW unit 4 performs specified processing (for example, encoding) for information to be written, which is inputted from the control unit 5. Then, the RW unit 4 writes the information in question to the recording medium 1 through a write head included in the head 21.

The control unit 5 is connected to, for example, a computer that is used as a host. On the basis of an instruction from the host, the control unit 5 instructs the head driving controller 3 to move the head 21 to a location at which the information requested by the host is written, and also outputs to the host the information that is output by the RW unit 4. Further, according to a write request from the host, the control unit 5 instructs the head driving controller 3 to move the head 21 to a location at which information is to be written, and also outputs to the RW unit 4 the information to be written.

Moreover, the control unit 5 instructs to form tracks, to which information is written, on a surface of the recording medium 1 so that the tracks are distributed, for example, in a concentric manner. At this time, the control unit 5 instructs to make a shingle write such that a first track of either the inner circumferential side or the outer circumferential side is partially overwritten by a second track of the other side on the recording medium 1.

Next, what will be described as an example is a case where the outer circumferential side of the first track is partially overwritten by the inner circumferential side of the second track, which is adjacent to the first track, so as to make a shingle write.

Furthermore, the control unit 5 in this embodiment instructs to write a position-error detection signal having the width of each data track to a data area of a data track group relating to the shingle write with parts which are not adjacent to each other being provided in the radial direction. For example, for each data track, the length of a data sector is divided by 2N (N is ½ or an integer that is greater than or equal to 1) to obtain the write length L. Then, one of the data tracks relating to the shingle write is used as an attention track to write a burst signal having the specified intensity by the write length L from the leading end of any of the data sectors on the attention track. After that, DC erase operation is performed for the subsequent part having the write length L. By repeating such operations, a signal part (position-error detection signal) in which the burst signal writing and the DC erase are alternately performed for each write length L is written to the attention track. To be more specific, what is called a position-error detection signal which corresponds to a C burst signal written to a servo sector is repeatedly written to the attention track.

Next, on a track adjacent to the attention track, a part having the write length L is DC-erased from the leading end of any one of data sectors. Then, operation of writing a burst signal having the specified intensity to the subsequent part having the write length L is performed. To be more specific, a position-error detection signal whose phase differs by 180 degrees from the position-error detection signal which has been written to the attention track (a signal corresponding to a so-called D burst signal that is written to a servo sector) is repeatedly written to the track adjacent to the attention track.

Figure 3:
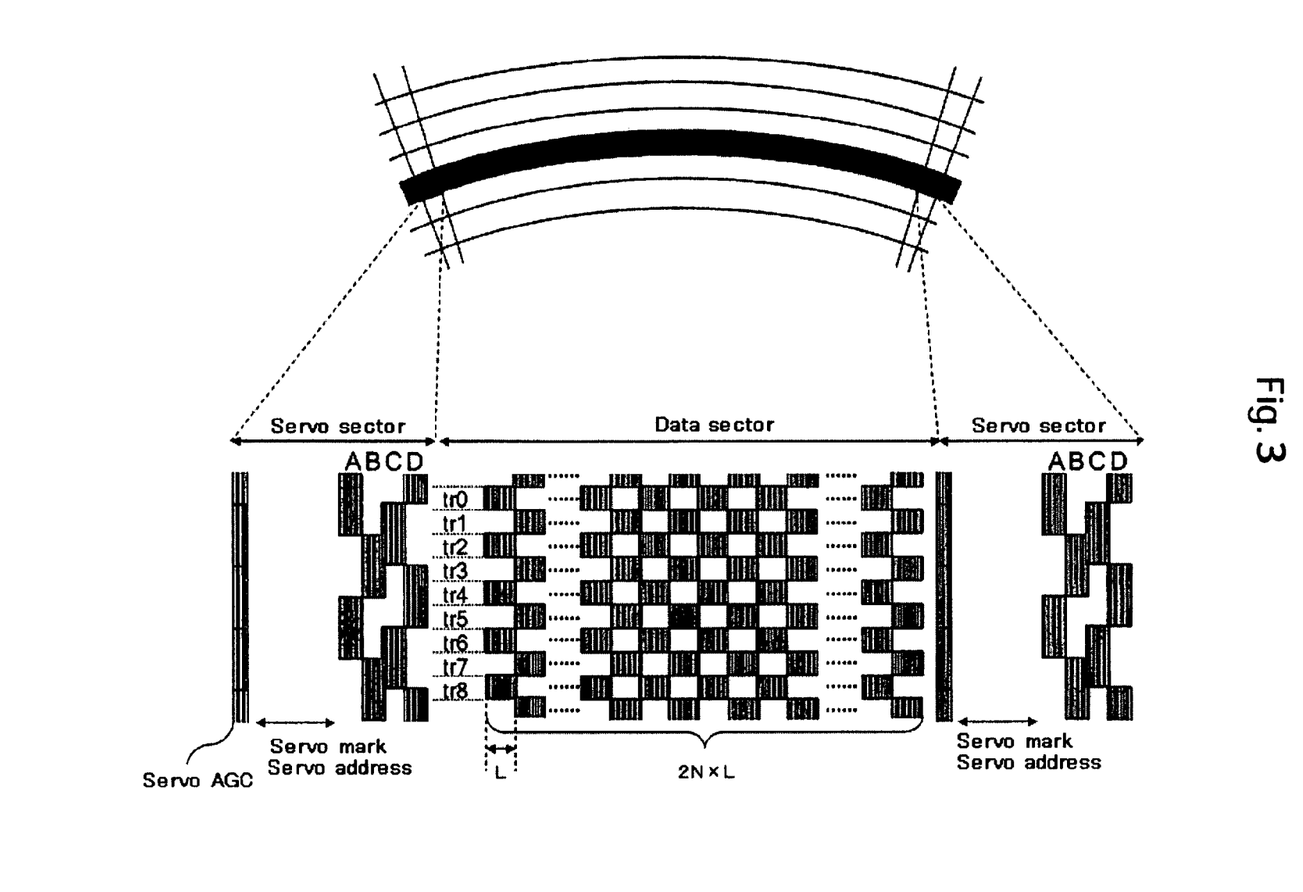
FIG. 3 is an explanatory diagram illustrating an example in which a position-error detection signal is written according to an embodiment of the present invention.

As shown in FIG. 3, writing the position-error detection signals in this manner causes a burst signal having the specified intensity (hatching part) and DC-erased part (empty part) to be arranged in the form of a checker pattern in the data track group relating to the shingle write. More specifically, position-error detection signals whose phases differ from each other are repeatedly written in the track direction at positions that deviate from each other by a track pitch in the track width direction. The number of position error signals which are detected per data sector is N (if N=½, this means that one position error signal is detected from two data sectors).

Incidentally, although the write length of the burst signal is specified using the data sector as a unit here, the present invention is not limited to this example. For instance, if two or more data sectors exist in a data area that is located between servo sectors, the write length of a burst signal may also be specified using the area between the servo sectors as a unit. Additionally, although it is assumed that the longitudinal recording method is adopted in this embodiment, the present invention can also be applied to disk drives that adopt the perpendicular recording method. In this case, the same effects can be achieved by performing AC erasing instead of DC erasing, or by differentiating a read signal received from a magnetic head.

Figure 5:
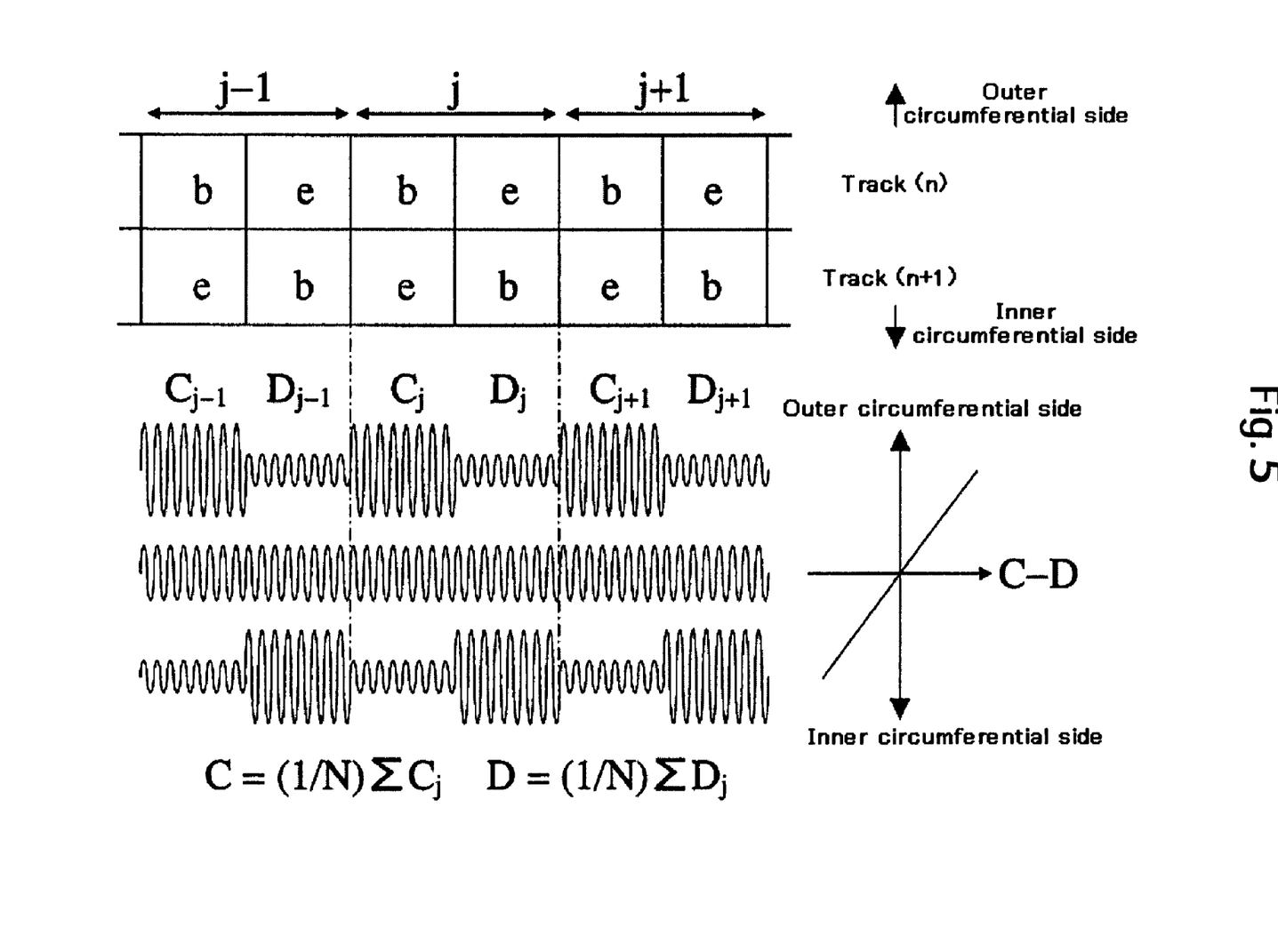
FIG. 5 is an explanatory diagram illustrating an example in which a position-error detection signal is written according to an embodiment of the present invention.

FIG. 5 is a diagram illustrating a recording pattern used to detect a boundary position between a track (n) and a track (n+1). A number j shown in the figure is a number indicating a pair of recording patterns (b) and (e) used to detect a position error of a certain data sector. Here, a value of the number j ranges from 1 to N. Shown below the number j is a conceptual diagram illustrating signal waveforms at the time of reading this recording pattern by the read head. When the read head passes through the track boundary, the amplitude $C_j$ of a C burst signal and the amplitude $D_j$ of a D burst signal become equal to each other (middle portion). When the read head deviates to the outer circumferential side, $C_j > D_j$ (upper portion). When the read head deviates to the inner circumferential side, $C_j < D_j$ (lower portion). Accordingly, $C_j - D_j$ becomes a position error signal that zero crosses at the track boundary. (C−D) which is obtained by averaging $C_j - D_j$ becomes a position error signal for the particular data sector (here, C, D are average values of $C_j$, $D_j$, the number of which is N). Moreover, PES=(C−D)/(C+D), which is obtained by averaging the position error signals of all sectors in one track, becomes an average position error signal for a track whose length is equal to one round. It is to be noted that the position error signal is normalized by dividing it by (C+D). Incidentally, if the track (n) is used as the reference, PES which is defined here is a position error signal for a boundary with an adjacent track on the inner circumferential side. Accordingly, the polarity thereof differs from that for a boundary with an adjacent track (n−1) on the outer circumferential side.

The control unit 5 further instructs to move the read head to such a position that a value of PES for the one-round track becomes substantially zero. As a result of the move, a center position of the read head becomes coincident with a boundary position of an adjacent track pair. To be more specific, while taking the polarity of PES into consideration, the control unit 5 controls the position of the read head so that a value of PES becomes closer to 0.

What is obtained next is the difference L(n) between a center position of the read head in question at a point in time when the center position of the read head is made coincident with a boundary position of a track pair, tracks of which are adjacent to each other (on the assumption that an (n) th track and an (n+1)th track are used), and a specified reference position determined on a track pair basis. Incidentally, the reference position is a center position C(n) of the write head at a point in time when a position-error detection signal is written to one of the tracks constituting the track pair (for example, a track, part of which is overwritten).

Figure 6:
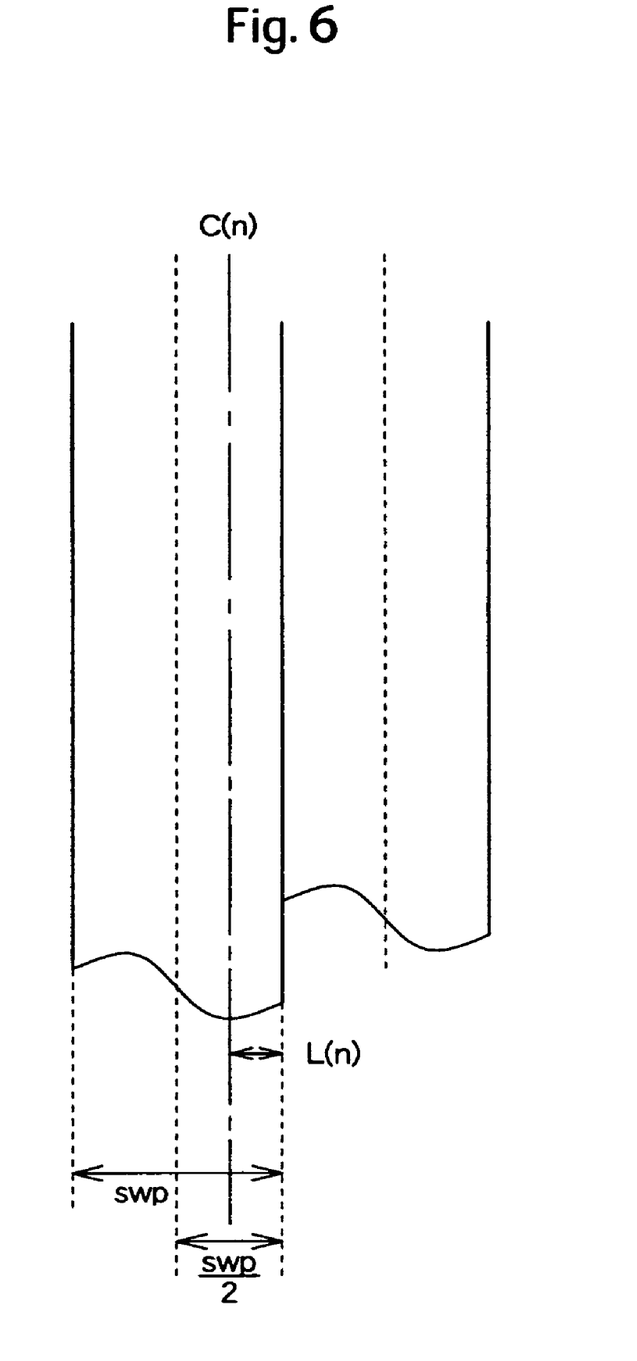
FIG. 6 is an explanatory diagram illustrating an example in which a head position is controlled according to an embodiment of the present invention.

The control unit 5 instructs to store this difference value L(n). Next, when information written to the (n) th track is read, the control unit 5 defines, as a track boundary, a position which is moved by the difference value L(n) from a position C(n) of the write head at a point in time when the information is written to the (n) th track in question. Then, the read head is moved to a position which is moved by SWP/2 (half of the track pitch SWP) from this track boundary (FIG. 6). This position is expressed by an equation of: P(n)=C(n)−L(n)+SWP/2.

Figure 4:
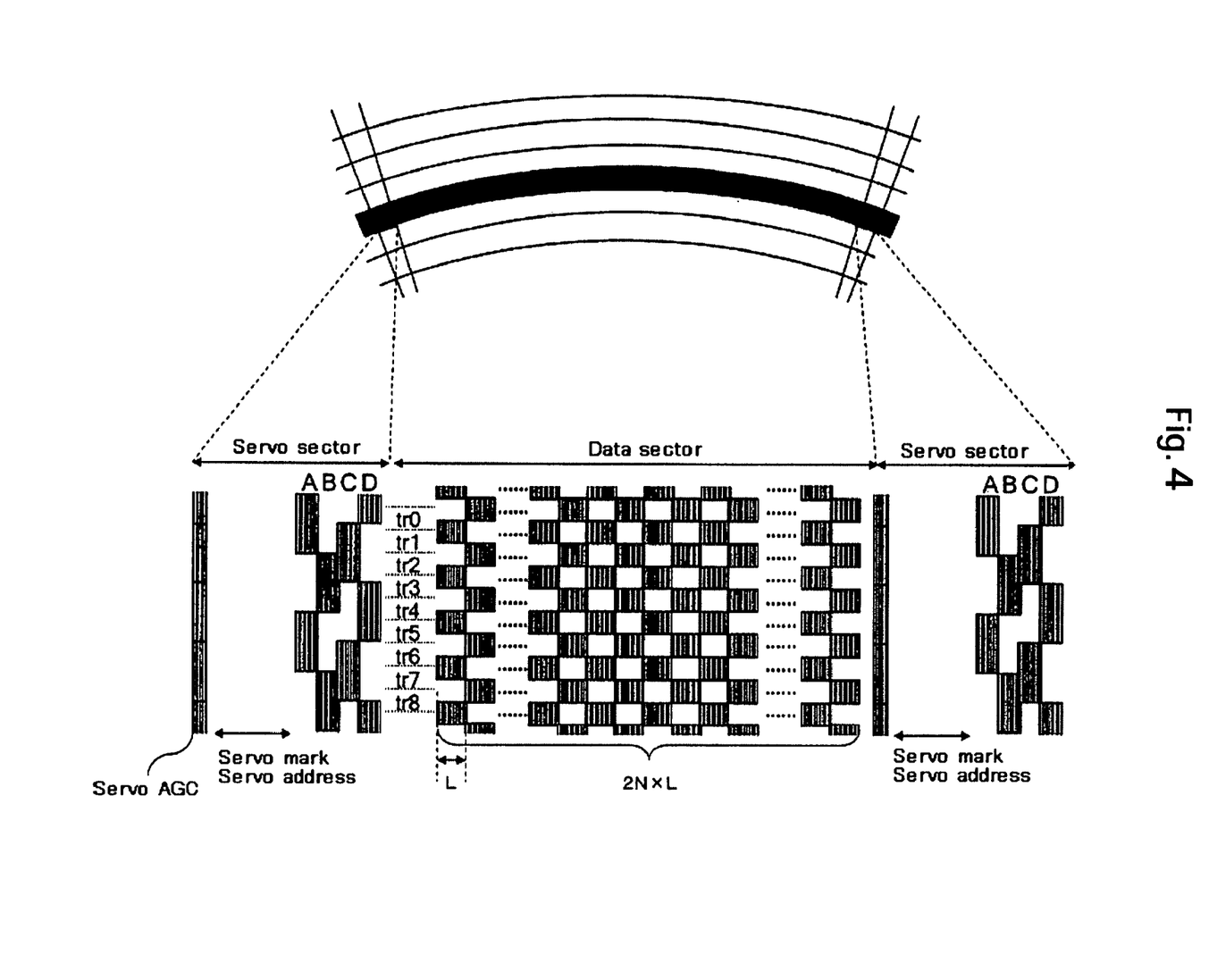
FIG. 4 is an explanatory diagram illustrating an example in which a position-error detection signal is written according to another embodiment of the present invention.

Incidentally, in the explanation described above, the example in which position-error detection signals were written over a range of the width of a track was described. However, so long as two kinds of position-error detection signals whose phases deviate from each other by 180 degrees deviate by a track pitch SWP in the radial direction of the recording medium 1, the position-error detection signals may also be written across two adjacent tracks. In other words, the position-error detection signals may also correspond to a so-called A burst signal and B burst signal that are written to a servo sector (refer to FIG. 4).

The offset adjustment steps described above are based on the premise that these offset adjustment steps are carried out in a process before shipment. Therefore, it is not realistic to carry out the steps after shipment. For this reason, if fluctuations in write current cause P(n) to change, test writing as described below is performed. To be more specific, by changing the positioning control of the write head, it is possible to cope with the change in P(n) without changing the positioning control of the read head.

First of all, in an offset adjustment process before shipment, two track pairs (n, n+1), (m, m+1) are written to a test write area allocated in a specific disk area. Next, track boundary positions L(n), L(m) of these pairs are acquired, and values of the positions are then stored. When the disk drive is started up after shipment, one (m, m+1) of the two track pairs is written again to acquire the track boundary positions of the two track pairs again. Here, these values are defined as L'(n) and L'(m). If the distance between track boundaries L'(n)−L'(m) coincides with L(n)−L(m) before shipment, writing is performed by use of an offset before shipment. If not, the amount of fluctuations in the offset is determined on the basis of the deviation thereof to correct the offset by use of the amount of fluctuations, and then writing is performed.

Figure 7:
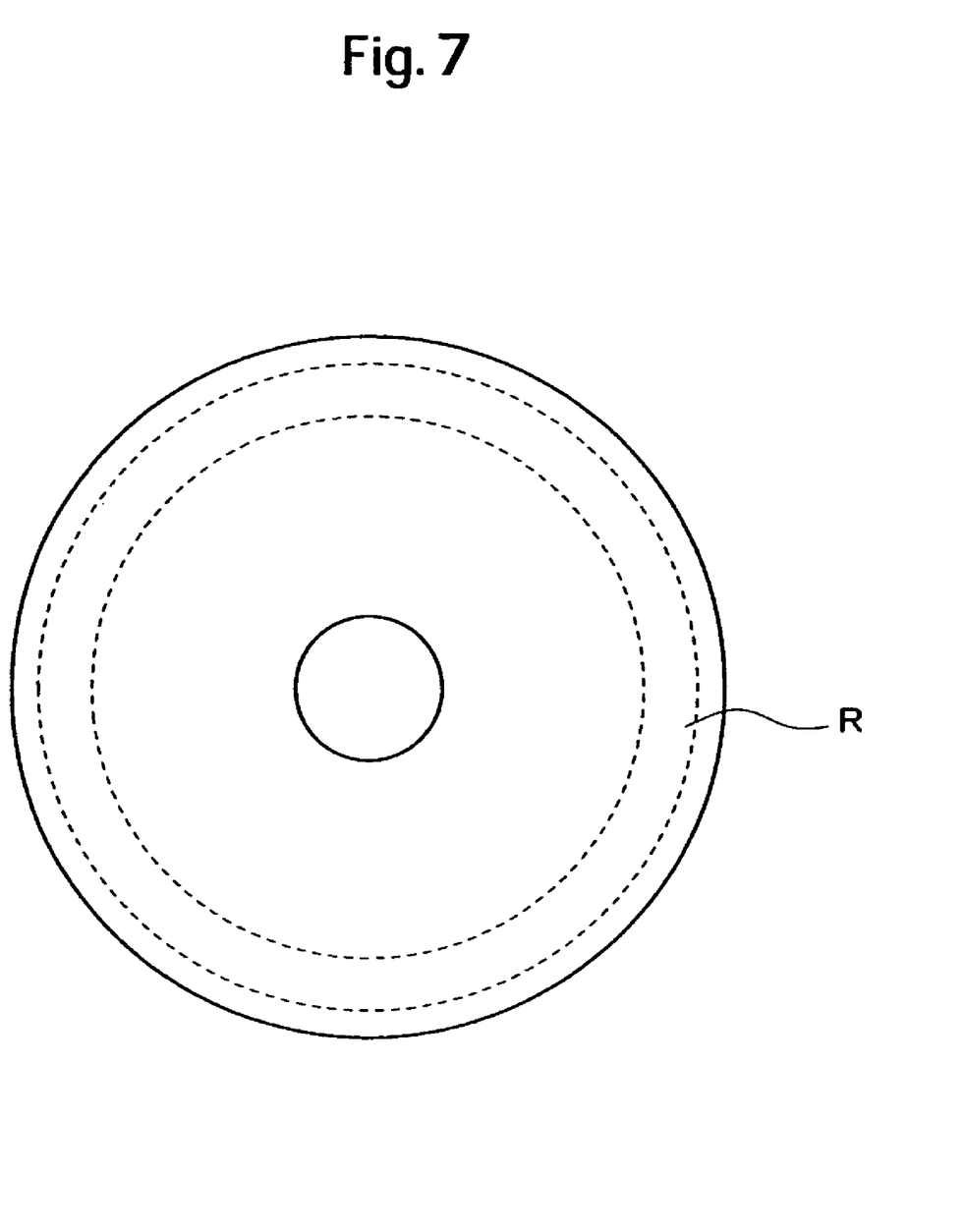
FIG. 7 is an explanatory diagram illustrating an example of a test area according to an embodiment of the present invention.

Here, as shown in FIG. 7, a test area R is provided, for example, relatively on the outer circumferential side on the recording medium. In addition, as far as disk drives are concerned, because a recording medium is in general divided into a plurality of zones in the disk radial direction, it is desirable that each zone be provided with a test write area.

Thus, according to this embodiment, in a case where the shingle write method is adopted, by writing a position-error detection signal to a data track so as to make use of the position-error detection signal, it is possible to determine the above offset of a magnetic head position through simple and easy processing that can cope with readjustment after shipment, and it is also possible to keep the accuracy of settings unchanged even if fluctuations in write track width occur.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A disk drive comprising:
a recording medium including data tracks that are concentrically or spirally formed, each of said data tracks being formed with part of each data track being overwritten by an adjacent data track on an inner circumferential side or by an adjacent data track on an outer circumferential side;
a head assembly including a write head for writing information to the recording medium, and a read head for reading out information from the recording medium; and
a control device to control a position of the head assembly relative to the recording medium;
wherein:
position-error detection signals whose phases differ from each other are repeatedly written to a data track area of the recording medium in a track direction with written positions of the position-error detection signals being deviated from each other by a track pitch in a track width direction; and
said control device controls a position of the head assembly on the basis of the position-error detection signals read out by the read head.

2. The disk drive according to claim 1, wherein said position-error detection signals are written to a test area that is predetermined on the recording medium.

3. The disk drive according to claim 1, wherein longitudinal recording is used for recording on the recording medium.

4. The disk drive according to claim 1, wherein the control unit instructs to move the read head so that values of the position-error detection signals become closer to zero, while taking into account polarity of the position-error detection signals.

5. The disk drive according to claim 1, wherein the control unit instructs to move the read head to a position P(n) by SWP/2 (half of a track pitch SWP) from a track boundary, C(n)−L(n), which is defined as a position which is moved by a difference value L(n) from a center position C(n) of the write head at a point in time when information is written to an n(th) track of the recording medium, such that $$P(n)=C(n)-L(n)+SWP/2,$$

where the difference value L(n) is between a center position of the read head at a point in time when the center position of the read head is made coincident with a boundary position of a track pair of adjacent n(th) and (n+1)th tracks, and a specified reference position determined on a track pair basis, and where the center position C(n) is a position of the write head at a point in time when a position-error detection signal is written to one of the tracks constituting the track pair.

6. A recording medium comprising:

data tracks that are concentrically or spirally formed, each of said data tracks being formed with part of each data track being overwritten by an adjacent data track on an inner circumferential side or by an adjacent data track on an outer circumferential side, wherein:

a plurality of data sectors are further formed in the circumferential direction on each of said data tracks; and position-error detection signals whose phases differ from each other are repeatedly written to a data track area of the recording medium in the track direction with written positions of the position-error detection signals being deviated from each other by a track pitch in the track width direction.

7. The recording medium according to claim 6, wherein said position-error detection signals are written to a test area that is predetermined on the recording medium.

8. The recording medium according to claim 6, wherein longitudinal recording is used for recording on the recording medium.

9. A disk drive control method, comprising:

providing a disk drive comprising, a recording medium including data tracks that are concentrically or spirally formed, each of said data tracks being formed with part of said each data track being overwritten by an adjacent data track on an inner circumferential side or by an adjacent data track on the outer circumferential side; and a head assembly including a write head for writing information to the recording medium, and a read head for reading out information from the recording medium;

repeatedly writing to a data track area of the recording medium, position-error detection signals whose phases differ from each other in a track direction with written positions of the position-error detection signals being deviated from each other by a track pitch in a track width direction; and reading out the position-error detection signals by the read head, and then controlling a position of the head assembly relative to the recording medium on the basis of the read position-error detection signals.

10. The disk drive control method according to claim 9, wherein said position-error detection signals are written to a test area that is predetermined on the recording medium.

11. The disk drive control method according to claim 9, wherein longitudinal recording is used for recording on the recording medium.

12. The disk drive control method according to claim 9, further comprising:

instructing to move the read head so that values of the position-error detection signals become closer to zero, while taking into account polarity of the position-error detection signals.

13. The disk drive control method according to claim 9, further comprising:

instructing to move the read head to a position P(n) by SWP/2 (half of a track pitch SWP) from a track boundary, C(n)–L(n), which is defined as a position which is moved by a difference value L(n) from a center position C(n) of the write head at a point in time when information is written to an n(th) track of the recording medium, such that $$P(n)=C(n)-L(n)+SWP/2,$$

where the difference value L(n) is between a center position of the read head at a point in time when the center position of the read head is made coincident with a boundary position of a track pair of adjacent n(th) and (n+1)th tracks, and a specified reference position determined on a track pair basis, and where the center position C(n) is a position of the write head at a point in time when a position-error detection signal is written to one of the tracks constituting the track pair.

* * * * *